United States Patent Office 3,350,289
Patented Oct. 31, 1967

3,350,289
IRRADIATION OF CROSS-CONJUGATED CYCLOHEXADIENONES
Paul J. Kropp, Springfield Township, Hamilton County, Ohio, assignor to The Procter & Gamble Company, Cincinnati, Ohio, a corporation of Ohio
No Drawing. Original application Aug. 20, 1962, Ser. No. 218,115. Divided and this application Oct. 22, 1965, Ser. No. 502,455
12 Claims. (Cl. 204—158)

This is a division of application Ser. No. 218,115, filed Aug. 20, 1962, now abandoned.

This invention relates to an irradiation process for the production of spiro ketone compounds and more particularly to the photochemical transformation of cross-conjugated cyclhexadienones to produce novel hydrocarbon spiran derivatives; namely, spiro[4.5]decenone compounds.

It is the object of the present invention to provide a process for the preparation of heretofore unknown spiro [4.5]decenone compounds characterized by a principal photolysis procedure, short irradiation time and relatively high yields of the desired products. Another object of the present invention is to provide a simple stereospecific synthesis of valuable and otherwise generally inaccessible organic alcohols. And a still further object of this invention is the provision of a process for irradiating easily obtainable cross-conjugated cyclohexadienone starting materials and certain substituted derivatives thereof which undergo photochemical rearrangement to yield new and useful irradiation products.

The foregoing objects are achieved by irradiating cross-conjugated cyclohexadienones with ultraviolet light, preferably in an acid medium, an aqueous acid medium being most highly preferred. Alternatively, the novel spiro[4.5] decenone compounds are obtained by irradiating cross-conjugated cyclohexadienones in a neutral organic solvent or in the absence of any medium, such irradiation including the steps of separating a cyclopropyl ketone irradiation product and heating said product in an organic acid in the absence of light.

It has been discovered that a cross-conjugated cyclohexadienone [4a-methyl-5,6,7,8-tetrahydro-2(4aH)-naphthalenone] and certain substituted derivatives thereof having the following general formula

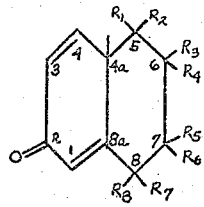

(I)

wherein $R_1$, $R_2$, $R_3$, $R_4$, $R_5$, $R_6$, $R_7$, and $R_8$ are each hydrogen atoms, halogen atoms, hydroxy groups or aliphatic or aromatic hydrocarbon groups such as alkyl, alkoxy, acyl, acyloxy, alkenyl, aralkyl, aralkenyl, aryl, or alkaryl groups, can be irradiated with ultraviolet light to produce one or both of the spiro[4.5]decenone compounds having the following general structures

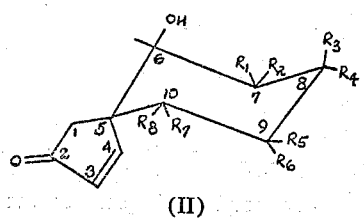

(II)

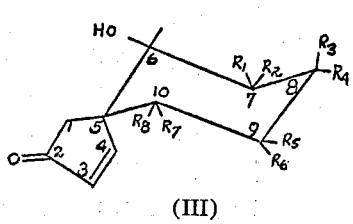

(III)

wherein $R_1$, $R_2$, $R_3$, $R_4$, $R_5$, $R_6$, $R_7$, and $R_8$ are each as they are defined above. The formation of the novel spiro ketone compounds II and III is particularly surprising and unexpected in view of the fact that previously only phenols and 5/7-fused ketone compounds have been observed to be formed with similar systems. The novel compounds of this invention are formed in addition to an expected phenol compound and other unidentified products under the photolysis conditions of this invention.

The new spiro[4.5]decenone compounds and their substituted derivatives are versatile starting materials and valuable intermediates in the synthesis of useful organic compounds, particularly organic alcohols which are prized perfume isolates. By way of illustration, the well known patchouli alcohol can be prepared from 6(axial)-hydroxy-6,10,10-trimethylspiro[4.5]dec-3-en-2-one 9(axial)-acetic acid obtained from 4aβ,8,8-trimethyl-5,6,7,8-tetrahydro-2 (4aH)-naphthalenone 7a-acetic acid by irradiation, for example, in an aqueous acid medium. Ring closure of the spiro[4.5]decenone by intramolecular Michael condensation, followed by decarboxylation gives 1-normethyl-2-oxypatchouli alcohol. Methylation and reductive removal of the carbonyl group then provides patchouli alcohol. Other related compounds such as cedrol, acoronone and patchulene which have interesting and desirable odor properties can also be prepared from the spiro[4.5]decenone compounds of this invention. Heretofore, these compounds, particularly the alcohols, were only available in limited quantities from their natural sources; for instance, in the case of patchouli alcohol, from the leaves of patchouli, an herb grown primarily in India.

In carrying out the present photochemical rearrangement, an acid is preferably employed as an irradiation medium. An organic or mineral acid in aqueous form is most highly preferred; for example, formic acid, acetic acid, hydrochloric acid or sulfuric acid which has been dispersed in a water solvent. In all cases, wherein an aqueous acid medium is employed, it is preferred to use an acid concentration between about 33 percent and about 60 percent of the total solution. However, other aqueous concentrations of acid can be employed as is found convenient. It has been established that irradiation in aqueous formic acid gives the highest yield of the desired spiro ketone compounds, therefore, aqueous formic acid is the particularly preferred acid medium. The choice of the irradiation medium in conjunction with the temperature employed partially governs the formation of the new and sought-after irradiation products as is more fully explained below.

The temperature at which the instant photochemical rearrangement is carried out can be varied widely; for example, between approximately 10° C. and the boiling point of the acid medium when an acid medium is employed. As suggested above, certain particular results are achieved by irradiation in a cold acid medium (about 10° C. to about 25° C.) or in a hot acid medium under reflux conditions. By way of illustration, the axial alcohol II is formed by the light-catalyzed rearrangement of a cyclohexadienone starting material I in an organic acid at low temperatures whereas both the axial alcohol II and the equatorial alcohol III are formed by the photochemical transformation of a cyclohexadienone starting material in an organic acid at high temperatures or, alternatively, by irradiation of the same material in a mineral acid at approximately room temperature. Thus, irradiating starting material in a cold organic acid gives only the axial alcohol II. On the other hand, when it is desired to obtain both spiro ketone compounds II and III by irradiating a cyclohexadienone in an organic acid solution, the irradiation is performed at or near the reflux temperature of the solution. Approximately the same yield of alcohol II is obtained whether the present photochemical rearrangement is conducted in hot or cold organic acid; the formation of alcohol III in hot organic acid is in addition to the formation of alcohol II. When the present photolysis is conducted in a mineral acid, both irradiation products, ketone compounds II and III, are produced. When using a mineral acid, it is preferred to run the irradiation procedure at a temperature between about 10° C. and about 25° C. Excessively hot mineral acids tends to catalyze chemical rearrangement or the cyclohexadienone starting material to less desirable phenol compounds at the expense of the formation or the desired spiro ketone compounds, compounds II and III.

When following the photolysis of the cyclohexadienone I by means of vapor phase chromatographic analysis of periodically removed aliquots, the presence of the cyclopropyl ketone intermediate IV is detected.

heating said compound in an organic acid in the absence of light. It is to be understood, however, that such synthesis proceeds originally by irradiation of a cross-conjugated cyclohexadienone starting material I, the irradiation being conducted in a neutral solvent or in the absence of any irradiation medium as opposed to the irradiation of a cyclohexadienone in the preferred acid medium or the most highly preferred aqueous acid medium.

According to the irradiation process of the present invention, photochemical transformation of the cyclohexadienone compounds I proceeds to the spiro ketone compounds II and III by the following routes:

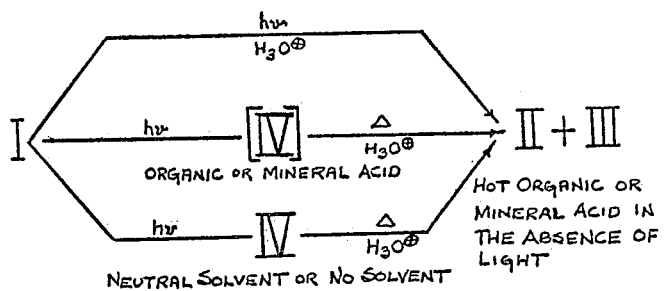

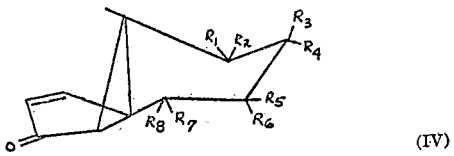

(IV)

It has been determined that the cyclopropyl ketone IV is the first product produced by the irradiation of a cross-conjugated cyclohexadienone. Compound IV quickly reaches and then maintains a steady-state concentration of about 10 percent of the total material until shortly after the last of the cyclohexadienone starting material has been transformed, at which time compound IV also disappears.

When isolated, the cyclopropyl ketone compound IV is stable in cold organic acid. Irradiation of compound IV in a cold organic acid such as aqueous acetic, formic or chloroacetic acid gives a phenol compound exclusively but refluxing compound IV with an organic acid solution in the dark produces a 2:1 mixture of the alcohols II and III that is uncontaminated by a phenol compound.

The cyclopropyl ketone compound IV is most readily produced by irradiating a cyclohexadienone starting material I in a neutral organic solvent such as hexane, dioxane, ethyl ether or tetrahydrofuran which precludes the direct formation of the ketone compounds II and III, or alternatively, by irradiation of a cyclohexadienone in the absence of any irradiation medium. Thus, an alternative multiple-step synthesis route is disclosed for obtaining the novel spiro[4.5]decenone compounds of the present invention comprising irradiating a cross-conjugated cyclohexadienone in a neutral organic solvent or in the absence of any medium, such irradiation including the steps of separating a cyclopropyl ketone compound IV and The further irradiation of compound IV in an aqueous acid medium, a neutral solvent or in the absence of any solvent gives a phenol compound. The formation of the phenol compound is to be expected; however, the rearrangement of the cyclohexadienone I to give the ketone compounds II and III in addition to the phenol compound is highly unexpected and surprising. The ketone compounds II and III can be separated from the phenol compound (and other unidentified minor ingredients which accompany the phenol compound) by adsorption chromatography on silica gel or alumina as hereinafter illustrated in the examples.

As previously indicated, the progress of the photochemical rearrangement of a cyclohexadienone can be followed by gas chromatographic or infrared analysis of aliquots periodically removed from the irradiation vessel. When it has been determined by such analysis that the cyclohexadienone starting material has been consumed, the reaction should be stopped. Excess irradiation tends to reduce the ultimate yield of the desired spiro [4.5]decenones.

For purposes of conducting the present photochemical rearrangement in an irradiation medium, it has been found most advantageous to disperse in the medium about 800 mg. of the cyclohexadienone per 100 ml. of medium. Concentrations in the order of from about 0.1 mole percent to about 20 mole percent are equally satisfactory.

High pressure mercury vapor lamps of 100 to 500 watt capacity can be used as a source of the ultraviolet radiation. A wavelength filter system is not required.

The reaction time of the present photolysis is generally between about 10 minutes and about 25 hours. As will be apparent, the reaction time varies with the concentration of the starting material in the irradiation medium, the intensity of the radiation source, the identity of the irradiation medium, the physical reaction conditions and the absorption of the incident light by the radiation vessel. The physical reaction conditions will, of course, vary considerably depending on whether the irradiation is carried out at or about room temperature, under reflux conditions or at a temperature therebetween. In all instances, however, it is generally most efficient to irradiate in an inert atmosphere; for example, nitrogen. To insure the vigorous and uniform irradiation of the cyclohexadienone starting material, it has been found to be expedient to bubble nitrogen gas through the reaction medium to agitate continuously the material to be irradiated. Quartz or Vycor radiation vessels are employed in preferance to ordinary glass vessels because they absorb less of the ultraviolet light.

The cross-conjugated cyclohexadienone starting materials can be prepared by any one of a number of known synthesis procedures, a convenient and direct route being the double condensation of formyl-cyclohexanones by refluxing with acetone as taught by Bloom [J. Am. Chem. Soc. 80, 6280 (1958)]. For example, 4aβ,8α-dimethyl-5,6,7,8-tetrahydro-2(4aH)-naphthalenone is prepared by treatment of 2,6-dimethyl-2-formyl-cyclohexanone with refluxing acetone in the presence of piperidine acetate catalyst. Unsubstituted cyclohexadienone and other substituted derivatives thereof which are useful in the present invention can be prepared by dehydrogenation of appropriately substituted hexahydro- and tetrahydro-naphthalenones.

The structures of the new spiro[4.5]decenone compounds produced by the process of this invention were established by examination of the infrared spectrum of the compounds, degradation and oxidation experiments and NMR spectrum analysis. [Paul J. Kropp and William F. Erman, Tetrahedron Letters 21 (1963).]

The process of this invention will be illustrated by the following specific embodiments. There are, of course, modifications of these embodiments which can be made by those skilled in the art without departing from the scope of this invention as defined in the appended claims.

EXAMPLE I

*Irradiation in cold acetic acid*

The irradiation was carried out using a 200-watt high pressure mercury vapor lamp. The lamp was placed in a Vycor water jacket which was, in turn, fitted inside a Pyrex reaction vessel of slightly larger diameter. The resulting annular space had a capacity of about 120 ml. and was employed as the reaction zone. Cold water was pumped through the water jacket during the photolysis at a rate sufficient to maintain the reaction mixture at a temperature of 20° C. Vigorous stirring of the reaction mixture was effected by the introduction of a stream of nitrogen through a jet opening in the bottom of the outer jacket.

A solution of 800 mg. of 4aβ,8α-dimethyl-5,6,7,8-tetrahydro-2(4aH)-naphthalenone in 100 ml. of 45% aqueous acetic acid was irradiated in this fashion for 3 hours. Gas chromatographic analysis of aliquots of the reaction mixture removed at 0.5-hour intervals showed that all of the cyclohexadienone had just been consumed at this time. The reaction mixture was diluted with an equal volume of toluene and then concentrated to dryness under reduced pressure on a rotary evaporator. Chromatography of the residue on 25 g. of silica gel gave, on elution with a 1:9 by volume ether-benzene mixture, 141 mg. (16%) of crystalline material subsequently identified as the axial alcohol, 6,10-dimethyl-6-hydroxyspiro[4.5]dec-3-en-2-one. Recrystallization three times from ether-hexane gave fine colorless needles, M.P. 98–99° C., λmax. 232 mµ (ε 7,100), molecular weight (mass spectrometry) 194.

*Analysis.*—Calculated for $C_{12}H_{18}O_2$: C, 74.19; H, 9.34. Found: C, 74.26; H, 9.44.

Infrared spectrum (in $CH_2Cl_2$): 2.73 (—OH), 5.84 and 5.95 (cyclopentenone $\overset{|}{C}=O$), 6.28 (conjugated $\overset{|}{C}=\overset{|}{C}$)

and 7.22, 7.38, and 8.55 (spiro fusion). NMR spectrum (in $CDCl_3$): doublets at 2.46 and 3.77τ ($J_{AB}=6$ cps.;

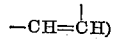
—CH=CH)

doublets at 7.29 and 7.91τ ($J_{AB}=19$ cps.;

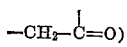
—CH₂—C=O)

singlet at 8.98τ

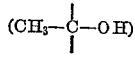
($CH_3-\overset{|}{C}-OH$)

and doublet at 9.30τ ($J_{AB}=6.5$ cps.;

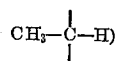
$CH_3-\overset{|}{C}-H$)

The spiro ketone II was unaffected by treatment overnight at room temperatures with acetic anhydride-pyridine or chromium trioxide-acetic acid mixtures.

Similar results are obtained when chloracetic acid is substituted for the acetic acid solution employed as the irradiation medium.

EXAMPLE II

*Irradiation in cold formic acid*

Irradiation of 4aβ,8α-dimethyl-5,6,7,8-tetrahydro-2(4aH)-naphthalenone as described in Example I except for the substitution of 45% aqueous formic acid for aqueous acetic acid was stopped after 14 hours. Work up and isolation as described in Example I gave 139 mg. (16%) of the crystalline spiro ketone II, 6,10-dimethyl-6-hydroxyspiro[4.5]dec-3-en-2-one, and a recovery of 262 mg. (33%) of the starting cyclohexadienone.

EXAMPLE III

*Irradiation in refluxing acetic acid*

4aβ,8α-dimethyl-5,6,7,8-tetrahydro-2(4aH)-naphthalenone was irradiated as described in Example I in 45% aqueous acetic acid except that a 100-watt lamp was employed, water was not passed through the water jacket, and the reaction mixture was heated under reflux with the aid of an oil bath. The irradiation was conducted for 24 hours. Gas chromatographic examination of the reaction mixture indicated that all of the cyclohexadienone had been consumed. Isolation (as described in Example I) gave 144 mg. (16%) of the axial alcohol II. The 6,10-dimethyl-6-hydroxyspiro[4.5]dec-3-en-2-one epimer III was obtained on elution with a 1:4 by volume ether-benzene mixture. Recrystallization of the spiro ketone III from ether-hexane gave fine colorless needles, M.P. 89.5–90.5° C. λmax 223 (ε 7,500), molecular weight 194.

*Analysis.*—Calculated for $C_{12}H_{18}O_2$: C, 74.19; H, 9.34. Found: C, 73.93; H. 9.23.

Except for some minor shifts in peak positions, the infrared and NMR spectra of the spiro ketone III have the same maxima as those of the spiro ketone II. However, the spiro ketone III has a doublet at 3600 and 3590 cm.⁻¹ (versus a singlet at 3600 cm.⁻¹ for the spiro ketone II) which is unaffected by dilution. The presence of intramolecular hydrogen bonding and hence an equatorially oriented hydroxyl group in the spiro ketone III is thus indicated.

EXAMPLE IV

*Irradiation in mineral acids*

Irradiation of 4aβ,8α-dimethyl-5,6,7,8-tetrahydro-2(4aH)-naphthalenone was carried out in 50% aqueous sulfuric acid as described in Example I except that the temperature of the reaction mixture was maintained at 15° C. Isolation as described in Example I gave 79 mg. (9%) each of the spiro ketone compounds, the axial alcohol II and the equatorial alcohol III. Similar results were obtained when a concentrated hydrochloride acid irradiation medium was employed in place of the aqueous sulfuric acid medium.

EXAMPLE V

*Irradiation in hexane*

A solution of 800 mg. of 4aβ,8α-dimethyl-5,6,7,8-tetrahydro-2(4aH)-naphthalenone in 100 ml. of hexane was irradiated at 20° C. in the apparatus described in Example I for 20 minutes. The neutral organic solvent was removed under reduced pressure on a rotary evaporator, and the resulting semicrystalline residue was chromatographed on 24 g. of silica gel. Elution with benzene gave 125 mg. (16%) of a pale yellow oil subsequently identified as the cyclopropyl ketone compound IV. Short path distillation gave a colorless oil, $\lambda_{max}$. 236 m$\mu$ ($\epsilon$ 6,100) and 206 m$\mu$ ($\epsilon_{apparent}$ 4,200).

Analysis.—Calculated for $C_{12}H_{16}O$: C, 81.77; H, 9.15. Found: C, 81.7; H, 9.21.

Infrared spectrum: (in $CCl_4$) 1.677$\mu$; (in $CH_2Cl_2$)

5.92 (conjugated $\overset{|}{C}=O$), 6.24 (conjugated $\overset{|}{C}=\overset{|}{C}$)

and 12.00$\mu$ cyclopropyl ring. NMR spectrum (in $CCl_4$): quartets at 2.62 and 4.22$\tau$ ($J_{AB}$=5.5. $J_{AC}$=0.8, and $J_{BX}$=1.1 cps.); doublet at 8.76$\tau$ ($J_{AB}$=7 cps., $CH_3$–$\overset{|}{C}H$)

and singlet at 8.82$\tau$ (tertiary methyl).

The semicarbazone derivative of the pure product was prepared, M.P. 206–208° C.

Analysis.—Calculated for $H_{13}H_{19}ON_3$: C, 66.92; H, 8.21; N, 18.01. Found: C. 66.54; H, 8.36; N, 17.74.

When dioxane, ethyl ether or tetrahydrofuran are substituted for hexane as the irradiation medium, similar results are obtained.

Gas chromatographic studies showed that the cyclopropyl ketone IV is involved as an intermediate in the photolysis rearrangement conducted in acidic irradiation media as described in the previous examples. The cyclopropyl ketone IV proved to be unaffected by treatment with 45% actic acid at room temperature; however, treatment at reflux for four hours gave the epimeric spiro ketones, the axial alcohol II and the equatorial alcohol III, in yields of 43% and 17%. The usually predominant spiro ketone (the axial alcohol II) was again the major isomer formed.

The following spiro[4.5]decenone products can be prepared by irradiating the indicated cross-conjugated cyclohexadienone starting materials in the apparatus described in Example I. Other organic radicals such as aralkyl, aralkenyl and alkaryl can also be substituted.

Cyclohexadienone starting materials:
  4a$\beta$-methyl-5,6,7,8-tetrahydro-2(4aH)-naphthalenone
  4a$\beta$,8,8-trimethyl-5,6,7,8-tetrahydro-2(4aH)-naphthalenone 7$\alpha$-acetic acid
  4a$\beta$,8,8-trimethyl-7$\beta$-hydroxy-5,6,7,8-tetrahydro-2(4aH)-naphthalenone 7$\alpha$-acetate
  4a$\beta$-methyl-5,6,7,8-tetrahydro-2(4aH)-naphthalenone 7$\alpha$-acetic acid
  4a$\beta$-methyl-5$\beta$-propionyl-8$\alpha$-chloro-5,6,7,8-tetrahydro-2(4aH)-naphthalenone
  4a$\beta$-methyl-6$\alpha$-ethyl-7$\beta$-vinyl-5,6,7,8-tetrahydro-2(4aH)-naphthalenone
  4a$\beta$-methyl-8-n-butoxy-5,6,7,8-tetrahydro-2(4aH)-naphthalenone
  4a$\beta$-methyl-7$\beta$-benzoyl-5,6,7,8-tetrahydro-2(4aH)-naphthalenone Spiro[4.5]decenone products:
  6-methyl-6-hydroxyspiro[4.5]dec-3-ene-2-one
  6,10,10-trimethyl-6-hydroxyspiro[4.5]dec-3-en-2-one 9-acetic acid
  6,10,10-trimethyl-6,9-dihydroxyspiro[4.5]dec-3-en-2-one 9-acetate
  6-methyl-6-hydroxyspiro[4.5]dec-3-en-2-one 9-acetic acid
  6-methyl-6-hydroxy-7-propionyl-10-chloro-spiro[4.5]dec-3-en-2-one
  6-methyl-6-hydroxy-8-ethyl-9-vinylspiro[4.5]-dec-3-en-2-one
  6-methyl-6-hydroxy-10-n-butoxy-spiro[4.5]dec-3-en-2-one
  6-methyl-6-hydroxy-9-benzoylspiro[4.5]dec-3-en-2-one There are, of course, many modifications of the specific embodiments which can be employed by those skilled in the art without departing from the spirit and scope of the invention as defined in the claims. It is understood that this invention is not limited to the exemplary embodiments set forth herein and that only such limitations may be imposed on the appended claims as are stated therein.

What is claimed is:

1. The process which comprises subjecting a compound having the general formula

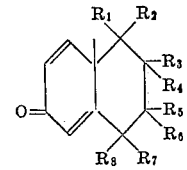

wherein $R_1$, $R_2$, $R_3$, $R_4$, $R_5$, $R_6$, $R_7$, and $R_8$ are each seelected from the group consisting of hydrogen, halogen, hydroxy, alkyl, alkoxy, acyl, acyloxy, alkenyl, aralkyl, aralkenyl, aryl and alkaryl groups to irradiation with ultraviolet light.

2. A process of claim 1 wherein said irradiation is carried out in the presence of an aqueous acid medium.

3. A process of claim 2 wherein the acid in said aqueous acid medium is selected from the group consisting of formic acid, acetic acid, chloroacetic aid, hydrochloric acid and sulfuric acid.

4. The process of claim 1 wherein the compound subjected to irradiation is 4a$\beta$-methyl-5,6,7,8-tetrahydro-2-(4aH)-naphthalenone.

5. The process of claim 1 wherein the compound subjected to irradiation is 4a$\beta$,8-dimethyl-5,6,7,8-tetrahydro-2(4aH)-naphthalenone.

6. The process of claim 1 wherein the compound subjected to irradiation is 4a$\beta$,8,8-trimethyl-5,6,7,8-tetrahydro-2(4aH)-naphthalenone 7$\alpha$-acetic acid.

7. The process of claim 1 wherein the compound subjected to irradiation is 4a$\beta$,8,8-trimethyl-7$\beta$-hydroxy-5,6,-7,8-tetrahydro-2(4aH)-naphthalenone 7$\alpha$-acetate.

8. The process of claim 1 wherein the compound subjected to irradiation is 4a$\beta$-methyl-5,6,7,8-tetrahydro-2-(4aH)-naphthalenone 7$\alpha$-acetic acid.

9. A process of claim 1 wherein said irradiation is carried out in the presence of a neutral organic solvent and including the steps of separating a cyclopropyl ketone and heating said cyclopropyl ketone with an organic acid in the absence of light.

10. A process of claim 9 wherein said neutral organic solvent is selected from the group consisting of hexane, dioxane, ethyl ether and tetrahydrofuran, and said organic acid is selected from the group consisting of formic acid, acetic acid and chloroacetic acid.

11. A process of claim 1 wherein a cyclopropyl ketone is separated and heated with an organic acid in the absence of light.

12. A process of claim 11 wherein said organic acid is selected from the group consisting of formic acid, acetic and chloroacetic acid.

References Cited

UNITED STATES PATENTS 3,032,491   5/1962   Barton et al. _____ 204—158

HOWARD S. WILLIAMS, Primary Examiner.